US007752030B2

(12) United States Patent
Weissmann

(10) Patent No.: US 7,752,030 B2
(45) Date of Patent: Jul. 6, 2010

(54) VIRTUALIZATION AS EMULATION SUPPORT

(75) Inventor: Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 10/910,931

(22) Filed: Aug. 3, 2004

(65) Prior Publication Data
US 2006/0031060 A1    Feb. 9, 2006

(51) Int. Cl.
*G06F 9/455* (2006.01)
(52) U.S. Cl. .......................... 703/26; 703/27
(58) Field of Classification Search .......... 703/23, 703/27, 26; 711/11; 718/1
See application file for complete search history.

(56) References Cited

U.S. PATENT DOCUMENTS

| 6,075,938 A * | 6/2000 | Bugnion et al. ............... 703/27 |
| 6,496,847 B1 * | 12/2002 | Bugnion et al. ............... 718/1 |
| 2005/0132365 A1 * | 6/2005 | Madukkarumukumana et al. ............... 718/1 |

* cited by examiner

*Primary Examiner*—Paul L Rodriguez
*Assistant Examiner*—Luke Osborne
(74) *Attorney, Agent, or Firm*—Blakely, Sokoloff, Taylor & Zafman LLP

(57) ABSTRACT

A processor based system including a processor and a storage subsystem communicatively coupled with the processor, an operating system stored in the storage subsystem to schedule instructions for execution, including a driver in which are included a virtual machine monitor and an emulator for an emulated processor; and a virtualization subsystem of the processor based system to generate an event for the virtual machine monitor.

15 Claims, 2 Drawing Sheets

Figure 4

VIRTUALIZATION AS EMULATION SUPPORT

BACKGROUND

Virtualization technology enables a single host running a virtual machine monitor to present multiple abstractions of the host, such that the underlying hardware of the host appears as one or more independently operating virtual machines. Each virtual machine may therefore function as a self-contained platform. Often, virtualization technology is used to allow multiple operating systems to coexist and execute apparently simultaneously on the same hardware platform.

Emulation technology is used to emulate features of one hardware platform in software that executes on a (usually) different hardware platform. For instance, emulation may be used to test programs designed to execute on a future processor that is not yet in production by executing the programs on an emulator for the future processor that is capable of execution on a platform based on a current processor.

A specific case of emulation is one where one model of a base processor is being emulated on another model of the same base processor. In this type of situation, most instructions execute identically on the two models. However there may be some instructions that while being valid instructions for both processor models, execute with different results on the two processor models, and therefore must be emulated when emulating one model of a processor on a physical processor that is a different model. Examples of such instructions are instructions that access to model-specific registers of the processor, access identifying information of the processor, and access model-specific ports of the processor or another system device.

While emulation of completely new instructions for a new processor may be performed on an existing processor by trapping an illegal instruction event, which would occur when the processor attempts to execute the illegal instruction, the emulation of existing instructions that are different in their behavior but not invalid in a new model of a processor cannot be performed by this technique, because the instruction would not generate an illegal instruction event.

Another alternative for emulation of a new model of a processor is to reprogram an older model of the processor at a microcode level to change its behavior to simulate that of the new model. Microcode emulation is generally complex, has high coding effort requirements, and may not be feasible if functionality of the new model of the processor is not supported by the old model's hardware, or if the processor does not have a microcode-based instruction set.

DETAILED DESCRIPTION

Figure 1:
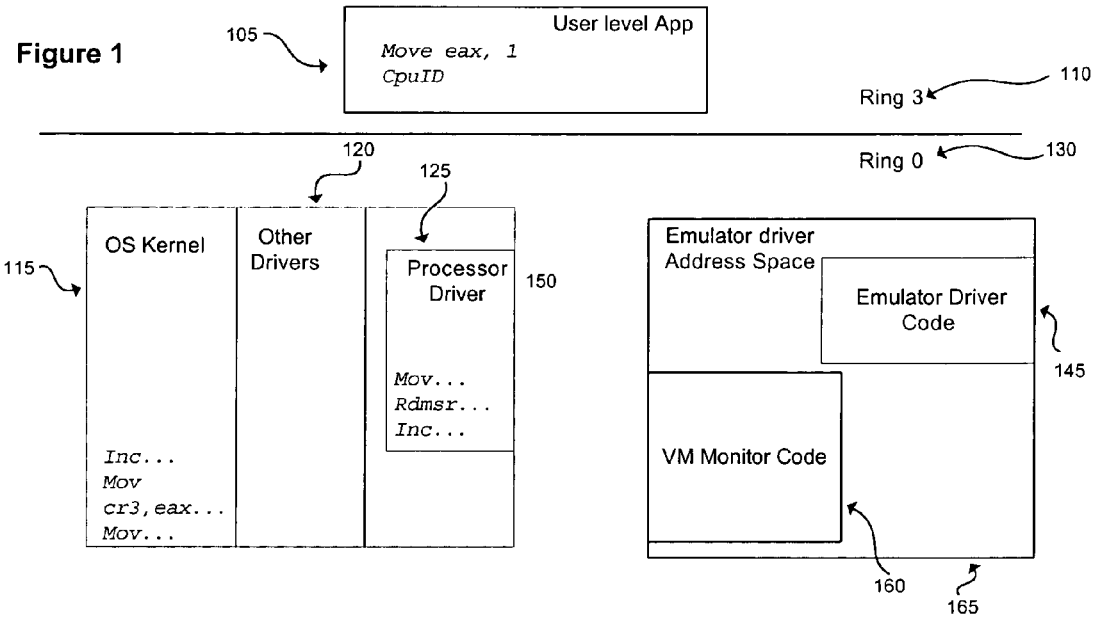
FIG. 1 represents at a high level a set of relevant objects loaded into memory in one embodiment.

FIG. 1 depicts, at a high level, a memory map of an emulation of one model of a base processor running on a processor based system that itself is based in physical hardware on another model of the base processor. As shown in FIG. 1, an operating system (OS) 115 executes along with other core OS drivers 120 and a processor driver 125 at a maximum privilege level (termed Ring 0 as is common in the art, in this embodiment) at 130. User code 105 also executes in this system at a different and generally lower privilege level, such as Ring 3 at 110. An emulator driver 165 is loaded into the memory of the system in Ring 0 as part of the drivers loaded by the OS.

The code of the emulator driver 145 is used in this embodiment to simulate the execution of instructions that differ in their results when executed on an emulated model of a base processor from the results when executed on the physical processor of the system, which is in general a different model of the base processor. In addition to emulator code 145 that actually performs emulation, the emulator driver in the embodiment also includes a virtual machine monitor, or VMM 160. As the operating system and user code execute on the system, they may attempt to execute one of a predetermined set of instructions that are model specific and differ in their effects between the emulated model of the processor and the physical model of the processor, and therefore need to be intercepted for emulation. Such an instruction may be a CPUID instruction that returns model specific information about the CPU that is executed, in one example by a user process 105 running in ring 3 at 110, or, in another example, it may be a RDMSR instruction to read a model specific register in a processor driver of the OS 125, or in yet another example, it may be another model specific instruction the OS kernel 115 attempts to execute. As will be explained below, the VMM serves an important role in intercepting such instructions.

Figure 2:
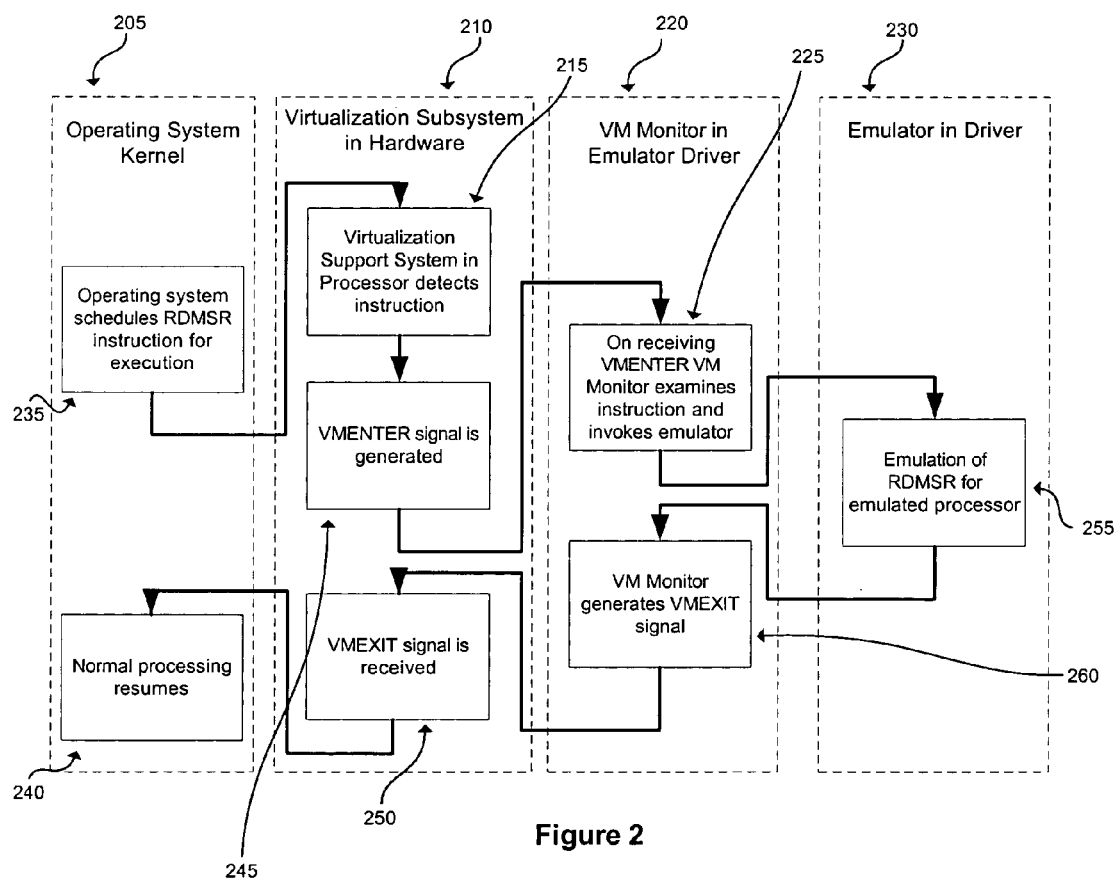
FIG. 2 represents the processing in an embodiment at a high level.

Processing in accordance with this embodiment may be understood with reference to FIG. 2, which is a flowchart of processing in the embodiment. Each of the vertical blocks 205, 210, 220 and 230 represent actions occurring in the OS kernel, virtualization subsystem, VMM, and Emulator respectively. OS kernel 205 executes on the processor based system and schedules instructions for execution. At 235, the OS kernel attempts to execute a RDMSR instruction. FIG. 2 represents at 210 the operation of a virtualization subsystem. In general, a portion of the system devoted to hardware support for virtualization is termed the virtualization subsystem. In this embodiment, the processor of the processor based system includes virtualization support, and thus the virtualization subsystem is implemented by the processor. The virtualization support may, however, in other embodiments be in another part of the processor based system such as on a separate device that is connected to the main processor bus of the system. The RDMSR instruction is intercepted by the virtualization subsystem 210 at 215, which then generates a VMENTER signal 245. The VMM in the emulator driver at then performs processing as depicted in FIG. 2 at 220 by examining the current instruction at 225 in response to the VMENTER event and determining based on the content of the instruction whether it should be executed by the underlying hardware or emulated. In this example, the RDMSR instruction is model specific and its behavior on the emulated processor is different from its behavior on the physical processor of the system. The VMM therefore emulates the instruction by passing it at 225 to the emulator 230 for execution at 255. Once emulation is complete, the VMM generates a VMEXIT signal 260 which causes the suspended process to resume normal execution from the point following the instruction that caused the VMENTER, as at 250 and 240. Thus, control resumes in the interrupted OS or user process.

The specific instructions or conditions that give rise to a VMENTER may be varied in different embodiments. In some embodiments, only instructions relating to model specific registers may cause the VMENTER signal to be raised. In other embodiments, any specific identifiable instruction may be used for specific emulation needs.

Figure 3:
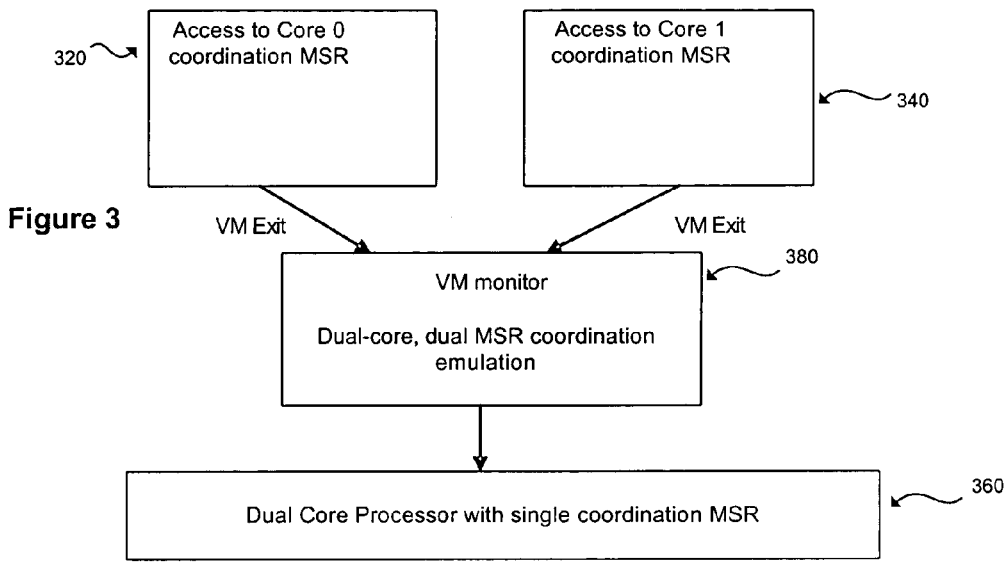
FIG. 3 depicts emulation of dual-core processor coordination of one model of a processor on another model of the processor, at a high level.

For example, a process like the one discussed above may be used to emulate instructions that access input-output ports of a processor, where such ports are model-specific. In yet another embodiment, a dual-core model of a processor with dual coordination registers be emulated on a model of the same base processor with a single coordination register as depicted in FIG. 3. As in the figure, the two-core virtual processor has two separate model specific coordination registers which are accessed by different model-specific instructions 320 and 340, such as, for example, instructions with different parameters specifying the core (0 or 1) being accessed by the instruction. Because the physical processor 360 in this embodiment has a single coordination register to coordinate actions between the two physical cores, the VMM 380 traps the two-core coordination instructions with a VMENTER and emulates two-core coordination with two emulated coordination registers, using the single physical coordination register of the underlying physical processor.

As those in the art would appreciate, implementing an emulator as part of an operating system driver as is done in this embodiment generally allows the use of normal programming and debugging techniques in the design and implementation of the emulator, and may allow the emulator to use the full resources of the system for its processing logic, as contrasted with e.g., a microcode emulator which may require special microcode design and implementation support and generally has far fewer resources for emulation itself.

In some embodiments, the logical layout of the kernel, VMM, and emulator may differ from the embodiments described above. In one instance, the VMM may operate as part of the kernel; in others, it may run as a user level process. In another instance, the VMM and emulator may be incorporated in separate drivers. Further, it is not required that a system on which embodiments are implemented have access restrictions structured on a ring basis as discussed in connection with the described embodiments. In one embodiment, all processes and the operating system may execute at a single access level. Many other access restriction schemes are possible as is known in the art.

Figure 4:
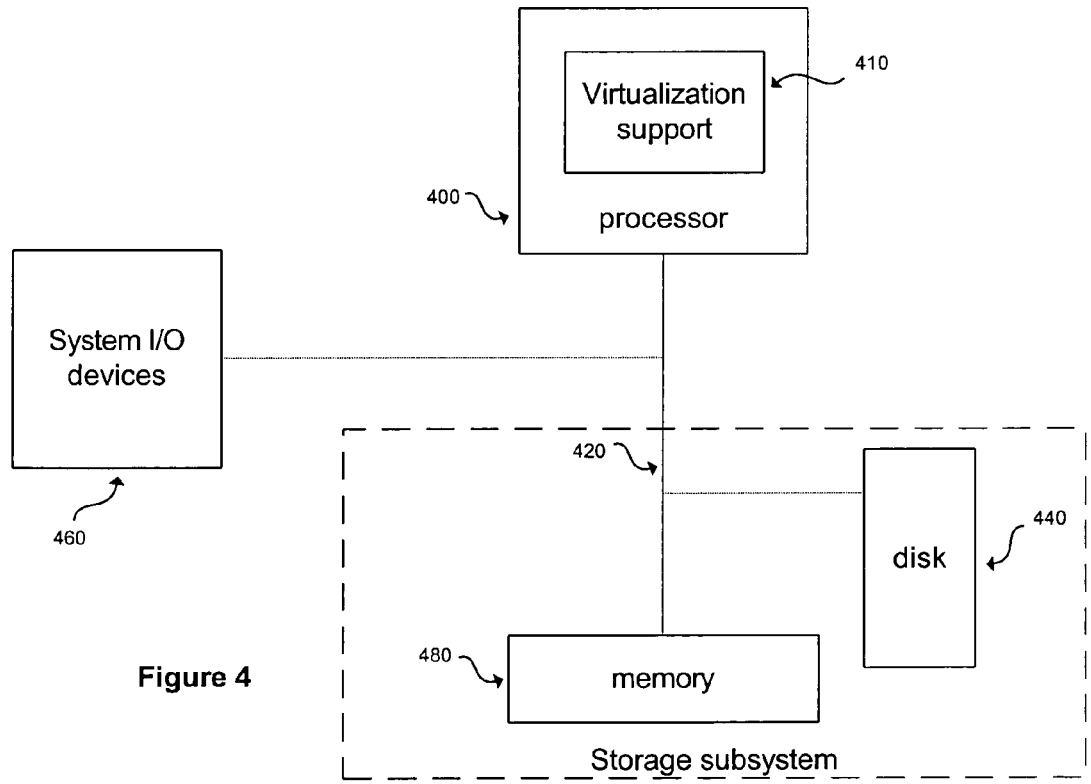
FIG. 4 is a processor based system implementing an embodiment.

In general, an embodiment may be implemented at least in part by a processor based system such as that depicted in FIG. 4. Such a system is a processor based system including a processor 400, a storage subsystem including memory 480 to store data and programs executable by the processor, and a non-volatile storage unit such as a disk system 440, interconnected by a bus system 420, and interfacing with the external network or users through system I/O devices and peripherals 460. A driver embodiment as described may be stored on the disk system and loaded into memory via the bus system and executed by the processor on instructions in a program or operating system which may also be stored on the disk system and optionally in memory. Virtualization support in this embodiment is provided by processor subsystem 410.

While certain exemplary embodiments have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments or some of their features in hardware, programmable devices, firmware, software or a combination thereof.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A processor based system comprising:
 a processor and a storage subsystem communicatively coupled with the processor, the processor being one of a plurality of models of a base processor;
 an operating system stored in the storage subsystem, to schedule instructions for execution on the processor, the scheduled instructions including model-specific instructions wherein a behavior of a model-specific instruction executing on the processor differs depending on which model of the plurality of models is executing the model-specific instruction;
 an instruction identification, stored in the storage subsystem, the instruction identification identifying a predetermined set of instructions that are model-specific instructions;
 a driver of the operating system, further comprising a virtual machine monitor and an emulator for a model of the plurality of models of the base processor, the emulated model of the base processor being a different model than the model of the processor on which the instructions are being scheduled; and
 a virtualization subsystem of the processor based system to generate an event for the virtual machine monitor, at least in partial response to intercepting a model-specific instruction identified as an instruction of the predetermined set of instructions, the intercepted model-specific instruction being scheduled for execution on the processor, wherein the behavior of the intercepted model-specific instruction when executing on the processor is determined to differ from the behavior of the intercepted model-specific instruction when emulating execution on the emulated model of the base processor.

2. The processor based system of claim 1 wherein the virtual machine monitor is to invoke the emulator to emulate execution of the intercepted model-specific instruction on the emulated model of the base processor in response to the event.

3. The processor based system of claim 2 wherein the intercepted model-specific instruction for which execution is being emulated on the emulated model of the base processor further comprises an instruction to access a predetermined register of the emulated model of the base processor.

4. The processor based system of claim 2 wherein the intercepted model-specific instruction for which execution is being emulated on the emulated model of the base processor further comprises an instruction to retrieve an identifier of the emulated processor.

5. The processor based system of claim 2 wherein the intercepted model-specific instruction for which execution is being emulated on the emulated model of the base processor further comprises an instruction to access a predetermined input/output (I/O) port of the emulated processor.

6. A computer-implemented method comprising:
loading a driver into memory of a processor based system at a high privilege level, the processor based system having a physical processor, the driver comprising a virtual machine monitor and an emulator for a model of a base processor, the emulated model of the base processor being a different model than the model of a physical processor of the processor based system;
scheduling an instruction for execution in an operating system kernel on the processor based system;
intercepting the instruction if the instruction scheduled for execution is a predetermined instruction of a predetermined set of instructions that are model-specific instructions, the model-specific instructions executing differently depending on which model of the physical processor is executing the model-specific instruction; and
a virtualization subsystem of the processor based system generating an event for the virtual machine monitor in response to the intercepting of the instruction scheduled for execution, wherein a behavior of the intercepted model-specific instruction when executing on the physical processor is determined to differ from the behavior of the intercepted model-specific instruction when emulating execution on the emulated model of the base processor.

7. The computer-implemented method of claim 6 further comprising:
the virtual machine monitor invoking the emulator to emulate execution of the intercepted instruction on the emulated model of the base processor in response to the event.

8. The computer-implemented method of claim 7 wherein the intercepted instruction further comprises an instruction to access a predetermined register of the emulated model of the base processor.

9. The computer-implemented method of claim 7 wherein the intercepted instruction further comprises an instruction to retrieve an identifier of the emulated model of the base processor.

10. The computer-implemented method of claim 7 wherein the intercepted instruction further comprises an instruction to access a predetermined I/O port of the emulated model of the base processor.

11. A machine readable medium having stored thereon data that when accessed by a machine causes the machine to perform a method, the method comprising:
loading a driver into a memory of a processor based system at a high privilege level, the processor based system having a physical processor, the driver comprising a virtual machine monitor and an emulator for a model of a base processor, the emulated model of the base processor being a different model than the model of a physical processor of the processor based system;
scheduling an instruction for execution on the processor based system;
intercepting the instruction if the instruction scheduled for execution is a predetermined instruction of a predetermined set of instructions that are model-specific instructions, the model-specific instructions executing differently depending on which model of the physical processor is executing the model-specific instruction; and
a virtualization subsystem of the processor based system generating an event for the virtual machine monitor in response to the intercepting of the instruction scheduled for execution on the processor based system, wherein a behavior of the intercepted model-specific instruction when executing on the physical processor is determined to differ from the behavior of the intercepted model-specific instruction when emulating execution on the emulated model of the base processor.

12. The machine readable medium of claim 11 wherein the method further comprises:
the virtual machine monitor invoking the emulator to emulate execution of the intercepted instruction on the emulated model of the base processor in response to the event.

13. The machine readable medium of claim 12 wherein the intercepted instruction further comprises an instruction to access a predetermined register of the emulated model of the base processor.

14. The machine readable medium of claim 12 wherein the intercepted instruction further comprises an instruction to retrieve an identifier of the emulated model of the base processor.

15. The machine readable medium of claim 12 wherein the intercepted instruction further comprises an instruction to access a predetermined I/O port of the emulated model of the base processor.

* * * * *